US009020980B2

(12) United States Patent
Roberts et al.

(10) Patent No.: US 9,020,980 B2
(45) Date of Patent: Apr. 28, 2015

(54) METHOD AND SYSTEM OF CONTENT DISTRIBUTION AND BROADCAST

(71) Applicants: Shaphan C. Roberts, Van Nuys, CA (US); Susan C. Hutcheon, Van Nuys, CA (US)

(72) Inventors: Shaphan C. Roberts, Van Nuys, CA (US); Susan C. Hutcheon, Van Nuys, CA (US)

( * ) Notice: Subject to any disclaimer, the term of this patent is extended or adjusted under 35 U.S.C. 154(b) by 129 days.

(21) Appl. No.: 13/797,026

(22) Filed: Mar. 12, 2013

(65) Prior Publication Data

US 2013/0332463 A1  Dec. 12, 2013

Related U.S. Application Data

(60) Provisional application No. 61/609,512, filed on Mar. 12, 2012.

(51) Int. Cl.
| | | |
|---|---|---|
| G06F 17/30 | (2006.01) | |
| H04N 21/2543 | (2011.01) | |
| H04N 21/2743 | (2011.01) | |
| H04N 21/478 | (2011.01) | |
| H04N 21/4788 | (2011.01) | |
| H04N 21/8355 | (2011.01) | |
| G06Q 30/02 | (2012.01) | |

(52) U.S. Cl.
CPC ...... *G06F 17/30058* (2013.01); *H04N 21/2543* (2013.01); *H04N 21/2743* (2013.01); *H04N 21/47815* (2013.01); *H04N 21/4788* (2013.01); *H04N 21/8355* (2013.01); *G06F 17/3002* (2013.01); *G06Q 30/0241* (2013.01); *G06Q 30/0273* (2013.01)

(58) Field of Classification Search
CPC .......... G06F 17/30058; G06F 17/3002; H04N 21/2743; H04N 21/2543; G06Q 30/0241; G06Q 30/0273
USPC .................................. 707/741, 802
See application file for complete search history.

(56) References Cited

U.S. PATENT DOCUMENTS

| | | | |
|---|---|---|---|
| 7,769,743 B2 * | 8/2010 | Wolzien | 707/709 |
| 2005/0163479 A1 * | 7/2005 | Green | 386/69 |
| 2006/0089914 A1 * | 4/2006 | Shiel et al. | 705/52 |
| 2008/0313169 A1 * | 12/2008 | Wolzien | 707/5 |
| 2009/0099919 A1 | 4/2009 | Schultheiss et al. | |
| 2009/0234850 A1 * | 9/2009 | Kocsis et al. | 707/6 |
| 2010/0174722 A1 | 7/2010 | Carteri | |
| 2011/0047207 A1 | 2/2011 | Gilder et al. | |
| 2011/0106911 A1 | 5/2011 | Sung et al. | |
| 2011/0202424 A1 | 8/2011 | Chun et al. | |

OTHER PUBLICATIONS

International Search Report Mailed Oct. 18, 2013 for International Application PCT/US2013/030561.

* cited by examiner

*Primary Examiner* — Robert Stevens
(74) *Attorney, Agent, or Firm* — Law Office of Stephen J. LeBlanc

(57) ABSTRACT

Methods and systems allowing content owners to make their content available to broadcasters over a network or communications medium such as via the Internet.

29 Claims, 3 Drawing Sheets

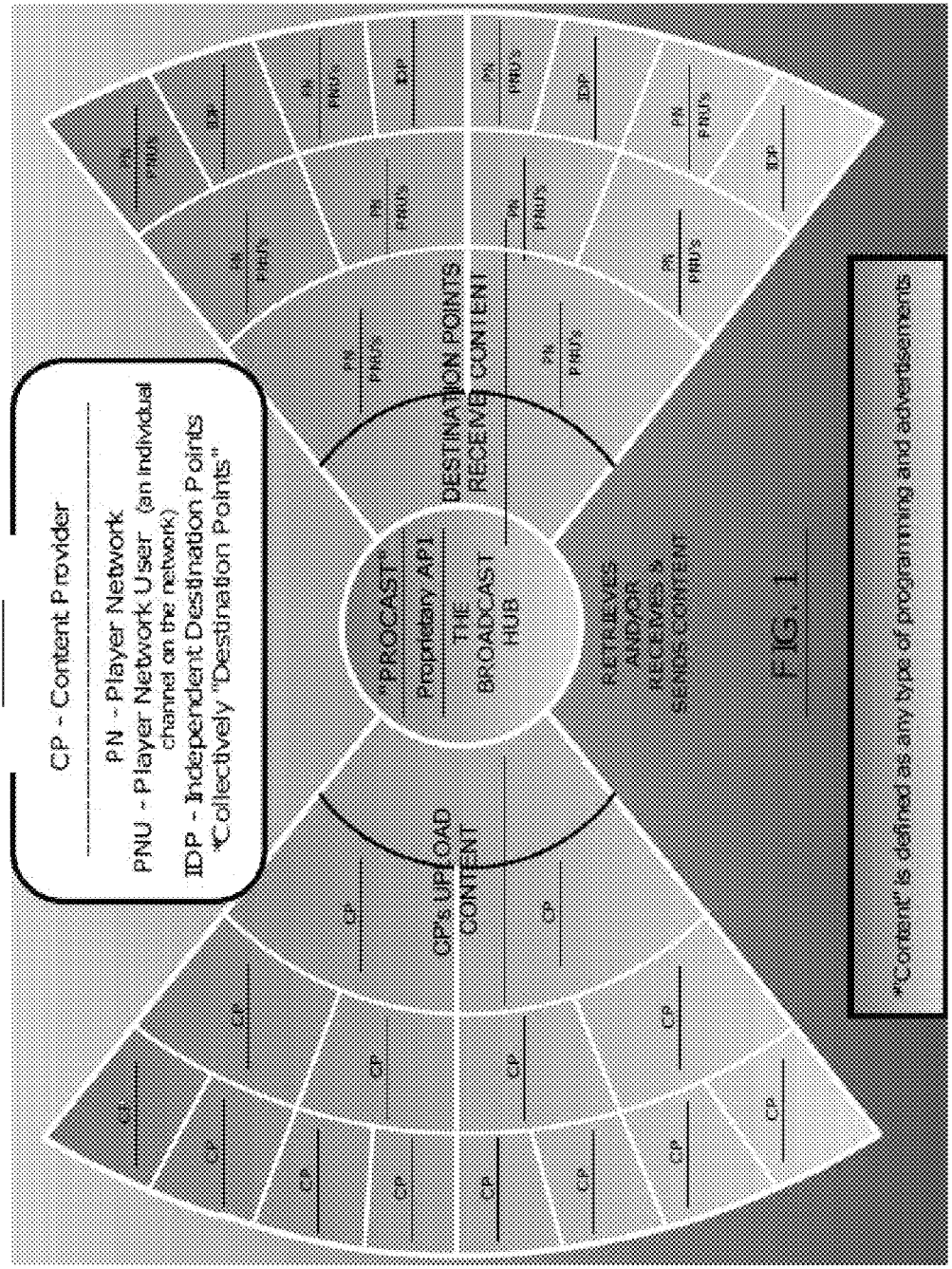

METHOD AND SYSTEM OF CONTENT DISTRIBUTION AND BROADCAST

CROSS REFERENCE TO RELATED APPLICATIONS

This application claims priority from provisional patent application 61/609,512, filed 12 Mar. 2012 and incorporated herein by reference.

COPYRIGHT NOTICE

Pursuant to 37 C.F.R. 1.71(e), Applicants note that a portion of this disclosure contains material that is subject to and for which is claimed copyright protection (such as, but not limited to, source code listings, screen shots, user interfaces, or user instructions, or any other aspects of this submission for which copyright protection is or may be available in any jurisdiction.). The copyright owner has no objection to the facsimile reproduction by anyone of the patent document or patent disclosure, as it appears in the Patent and Trademark Office patent file or records. All other rights are reserved, and all other reproduction, distribution, creation of derivative works based on the contents, public display, and public performance of the application or any part thereof are prohibited by applicable copyright law.

FIELD OF THE INVENTION

The present invention in various embodiments is directed to logic processing methods and/or related systems and/or business methods to provide users on the Internet or other communication channels with improved video and channel sharing and broadcasting over a communication connection. In specific embodiments, the invention relates to several novel logic methods and/or business methods and/or logic systems that allow an average web user to share digital content to a number of broadcasters and allows broadcasters to access, manage, share, and display video content, including content hosted on different video hosting services. In further embodiments, the invention allows user shared content to be monetized through a secure host system that makes content available for broadcasters and optionally, e.g., share in advertising revenue and product sales.

The present invention generally relates to a system and method for sharing content. More specifically, the present invention is an online broadcasting hub that is able to distribute audiovisual content between content providers, player networks, player network users, and independent destination points. The player networks, player network users, and independent destination points are collectively referred to as destination points.

BACKGROUND OF THE INVENTION

The discussion of any work, publications, sales, or activity anywhere in this submission, including in any documents submitted with this application, shall not be taken as an admission that any such work constitutes prior art. The discussion of any activity, work, or publication herein is not an admission that such activity, work, or publication existed or was known in any particular jurisdiction.

Traditionally, content providers would have to individually upload their audiovisual content to each individual video sharing website, such as YouTube and Vimeo, in order to reach a wider audience. The audience for the content provider would be limited by the number of websites that the content provider could visit. In addition, each video sharing website would be limited in their variety of the audiovisual content because their variety of audiovisual content depends on what kind of content a user uploads to their website. Thus, an objective of the present invention is to provide an online broadcasting hub that allows content providers to distribute their audiovisual content to a plurality of destination points, which include, but is not limited to, video sharing websites. The present invention is able to manage the audiovisual content from all of the content providers, to manage how that audiovisual data is sent to the destination points, and to manage the revenue sharing and advertising aspect between the content providers and the destination points. The content providers, the player networks, the player network users, and the independent destination points are able to access the online broadcasting hub with an application programming interface.

Traditionally, a content provider would also have the option to upload their audiovisual content to a simple online hub, which would distribute their audiovisual content to different channels on different video sharing websites. The simple online hub, such as TubeMogul/One Load, severely limits the audience of content provider because the different channels would be owned and operated by the content provider. Thus, another objective of present invention is to allow the destination points to access the audiovisual content from any content provider, which provides the content provider with a much larger audience than the audience from the simple online hub.

SUMMARY

According to specific embodiments, the present invention is involved with business methods and/or logic processing methods and/or systems and/or devices that can be used together or independently to provide a variety of different services and/or experiences related to managing, sharing, annotating, and broadcasting video and other media content. In specific embodiments, the invention can be understood as involving new business methods related to video hosting, broadcaster access, and advertising and product sales sharing.

In further embodiments, the invention can be understood as involved with systems and methods that can be used by a secure server to index or organize content from multiple content owners to be accessed by multiple broadcasters and to enable new ways of accessing video clips on the Internet and other communications systems and new ways to share revenues.

According to specific embodiments, an online broadcasting hub is capable of retrieving and/or, receiving and sending audiovisual content between a plurality of content providers and a plurality of destination points. A content provider is any entity that makes their audiovisual content accessible to the online broadcasting hub so to distribute their audiovisual content to the plurality of destination points. For example, a content provider can be a television network that wants to stream their programming feed or a radio station that wants to stream their music feed. A destination point is any entity that wants to receive or access audiovisual content from the online broadcasting hub. For example, a destination point can be a player network such as YouTube, Vimeo, Facebook, or HowCast, which are able to show audiovisual content from the online broadcasting hub to their users. A destination point can also be an end location not affiliated with a player network.

According to specific embodiments, methods and systems as described herein generally involve a proprietary software system and an application programming interface (API). The proprietary software is used to execute the internal functions of the online broadcasting hub, and the API is used by the content providers, the player networks, the player network users, and the independent destination points to access the online broadcasting hub.

According to specific embodiments, a computer executable process allows the online broadcasting hub to retrieve and/or receive and send audiovisual content between the content providers and the destination points. One part of the process is to collect the audiovisual content from each of the content providers through an API and then to compile a list of available content. The audiovisual content can either be pay-per-view, free-to-air, live stream, on-demand, or any other distribution method. If the audiovisual content is pay-per-view or on-demand, then the audiovisual content must be stored either on the online broadcasting hub, in an external location, or with the content provider, until it is requested by a destination point or more specifically a player network, a player network user or an independent destination point. If the audiovisual content is free-to-air or live stream, then the present invention can immediately reroute the audiovisual content to the plurality of destination points without any user input. Also, if the audiovisual content is free-to-air or live stream, then the present invention can store the audiovisual content either on the online broadcasting hub, in an external location, or with the content provider and can send the audiovisual content as a delayed or scheduled broadcast to the plurality of destination points.

The present invention provides the content providers with the ability to expand their reach to new audiences via the plurality of destination points. According to specific embodiments, a computer executable process sends the audiovisual content to the plurality of destination points or more specifically the player networks, the player network users or an independent destination point. In order to receive and/or access audiovisual content from a particular content provider through the online broadcasting hub, an independent destination point or a player network must become an affiliate of the online broadcasting hub, which allows the independent destination point, the player network and the player network users to access the online broadcasting hub. An independent destination point or player network user can then subscribe to and request audiovisual content from any content provider through the API.

The independent destination point or player network user is provided with the list of available content and a schedule describing when certain audiovisual content will be played. The signal for the audiovisual content can be simultaneously sent or fetched to all of the affiliated independent destination points, player networks and its users or be sent or fetched on-demand to one of the affiliated independent destination points, player networks and its users. In addition, the signal of the audiovisual content for all the content providers is managed by the online broadcasting hub.

According to specific embodiments, the online broadcasting hub has the ability to mass distribute audiovisual content from a particular content provider to all of the affiliated destination points. In addition, an affiliated player network can mass distribute the audiovisual content from a particular content provider to all of its player network users. The player network user can also use the API to mass distribute the audiovisual content from a particular content provider to all of their followers within their player network. Another part of the computer executable process is enabling the plurality of destination points to receive the content through the API. The API acts as an enhancement to the existing functionality of the independent destination points and player networks and enables the destination points to display the audiovisual content from the content providers. The API allows the destination points to act as satellite receivers when the online broadcasting hub sends a simultaneous or on-demand signal containing audiovisual content. The API for each destination point is uniquely designed to support the specific interface of the destination point. For example, the API could just be an add-on to the independent destination point or the player network's existing media player, or the API could completely replace the independent destination point or the player network's existing media player. In addition, the API prevents the content provider from sending their audiovisual content to an independent destination point or a player network user, unless that independent destination point or player network user subscribes to that particular content provider. As a result, the plurality of content providers are not able to spam destination points with their audiovisual content.

According to specific embodiments, a computer executable process allows for advertisements by allowing an advertiser to become a content provider and allows the advertiser to distribute their advertisement to the plurality of destination points through the online broadcasting hub. For example, a tool company can become a content provider by uploading a series of advertisements for their tools as their audiovisual content. A hardware store can then retrieve the audiovisual content for the tool company from the online broadcasting hub and display the audiovisual content on their website.

In addition, according to specific embodiments, advertisements can be integrated into the audiovisual content for a content provider such as commercials being run during a television station's programming feed and can allow advertisements to be integrated into the audiovisual content as a "call to action" link so that the content provider can direct the viewer to download something or direct the viewer to another website. Another part of the computer executable process provides a revenue sharing ability between the content providers, the player networks, the player network users and any independent destination points.

In order to have a revenue sharing ability generally each content provider and each destination point must sign a terms of agreement that outlines the distribution of the revenue generated by the audiovisual content. The revenue sharing ability is generally applicable if the audiovisual content is somehow related to sales advertising or if the audiovisual content is pay-per-view or on-demand. For example, the aforementioned tool company and hardware store would use the revenue sharing ability of the present invention. The revenue sharing ability creates new opportunities for both the content providers and the destination points to generate a new revenue stream. The present invention is also able to manage the revenue sharing between the content providers and the destination points.

Although the invention has been explained in relation to its preferred embodiments, it is to be understood that many other possible modifications and variations can be made without departing from the spirit and scope of the invention as herein described.

In particular embodiments, the invention involves a system (e.g., a system referred to at times herein as The Procast™ system that allows content owners to share content (e.g., media channels, video, video clips, audio, text, and other media) to a variety of different broadcasters.

Various embodiments of the present invention provide methods and/or systems for media content sharing over a communications network. According to specific embodiments of the invention, a client system is provided with a set of interfaces that allow a user to perform the various video organizing, uploading, and managing tasks described herein. The client system displays information indicating various video managing options and displays an indication of an action that a user is to perform to request various actions. In response to a user input, the client system sends to a server system the necessary information to access logic modules and any associated data. The server system uses the request data, and optionally one or more sets of server data, to process the request. According to specific embodiments of the present invention, a client system is, or has previously been, provided with an executable code file that allows the client system to receive the data.

Software Implementations

Various embodiments of the present invention provide methods and/or systems for video and media channels that can be implemented on a general purpose or special purpose information handling appliance using a suitable programming language such as Java, C++, Cobol, C, Pascal, Fortran, PL1, LISP, assembly, etc., and any suitable data or formatting specifications, such as HTML, XML, dHTML, TIFF, JPEG, tab-delimited text, binary, etc. In the interest of clarity, not all features of an actual implementation are described in this specification. It will be understood that in the development of any such actual implementation (as in any software development project), numerous implementation-specific decisions must be made to achieve the developers' specific goals and subgoals, such as compliance with system-related and/or business-related constraints, which will vary from one implementation to another. Moreover, it will be appreciated that such a development effort might be complex and time-consuming, but would nevertheless be a routine undertaking of software engineering for those of ordinary skill having the benefit of this disclosure.

Other Features & Benefits

The invention and various specific aspects and embodiments will be better understood with reference to the following drawings and detailed descriptions. For purposes of clarity, this discussion refers to devices, methods, and concepts in terms of specific examples. However, the invention and aspects thereof may have applications to a variety of types of devices and systems. It is therefore intended that the invention not be limited except as provided in the attached claims and equivalents.

Furthermore, it is well known in the art that systems and methods such as described herein can include a variety of different components and different functions in a modular fashion. Different embodiments of the invention can include different mixtures of elements and functions and may group various functions as parts of various elements. For purposes of clarity, the invention is described in terms of systems that include many different innovative components and innovative combinations of innovative components and known components. No inference should be taken to limit the invention to combinations containing all of the innovative components listed in any illustrative embodiment in this specification.

In some of the drawings and detailed descriptions below, the present invention is described in terms of the important independent embodiment of a system operating on a digital data network. This should not be taken to limit the invention, which, using the teachings provided herein, can be applied to other situations, such as cable television networks, wireless networks, mobile or video telephone networks, etc. Furthermore, in some aspects, the present invention is described in terms of client/server systems. A number of computing systems and computing architectures are described in the art as client/server art. For the purposes of this description, client/server should be understood to include any architecture or configuration wherein an element acting as a client accesses a remote and/or separate program or device that is providing the desired service (e.g., a server).

All references, publications, patents, and patent applications cited herein are hereby incorporated by reference in their entirety for all purposes.

BRIEF DESCRIPTION OF THE DRAWINGS

FIG. 1A-B are diagrams illustrating different example content delivery system according to specific embodiments of the present invention.

DESCRIPTION OF SPECIFIC EMBODIMENTS

Before describing the present invention in detail, it is to be understood that this invention is not limited to particular methods or systems, which can, of course, vary. It is also to be understood that the terminology used herein is for the purpose of describing particular embodiments only, and is not intended to be limiting. As used in this specification and the appended claims, the singular forms "a", "an" and "the" include plural referents unless the content and context clearly dictates otherwise. Thus, for example, reference to "a device" includes a combination of two or more such devices, and the like.

Unless defined otherwise, technical terms used herein have meanings as commonly understood by one of ordinary skill in the art to which the invention pertains. Although any methods and materials similar or equivalent to those described herein can be used in practice or for testing of the present invention, the preferred materials and methods are described herein.

1. Overview

According to specific embodiments of the invention, the invention provides data processing systems and/or methods and/or business methods that can be used together to provide the benefits described herein. The invention in various embodiments and some of the benefits and features of embodiments of the invention can be understood as described generally below.

2. Specific Embodiment Features

Figure 1A:
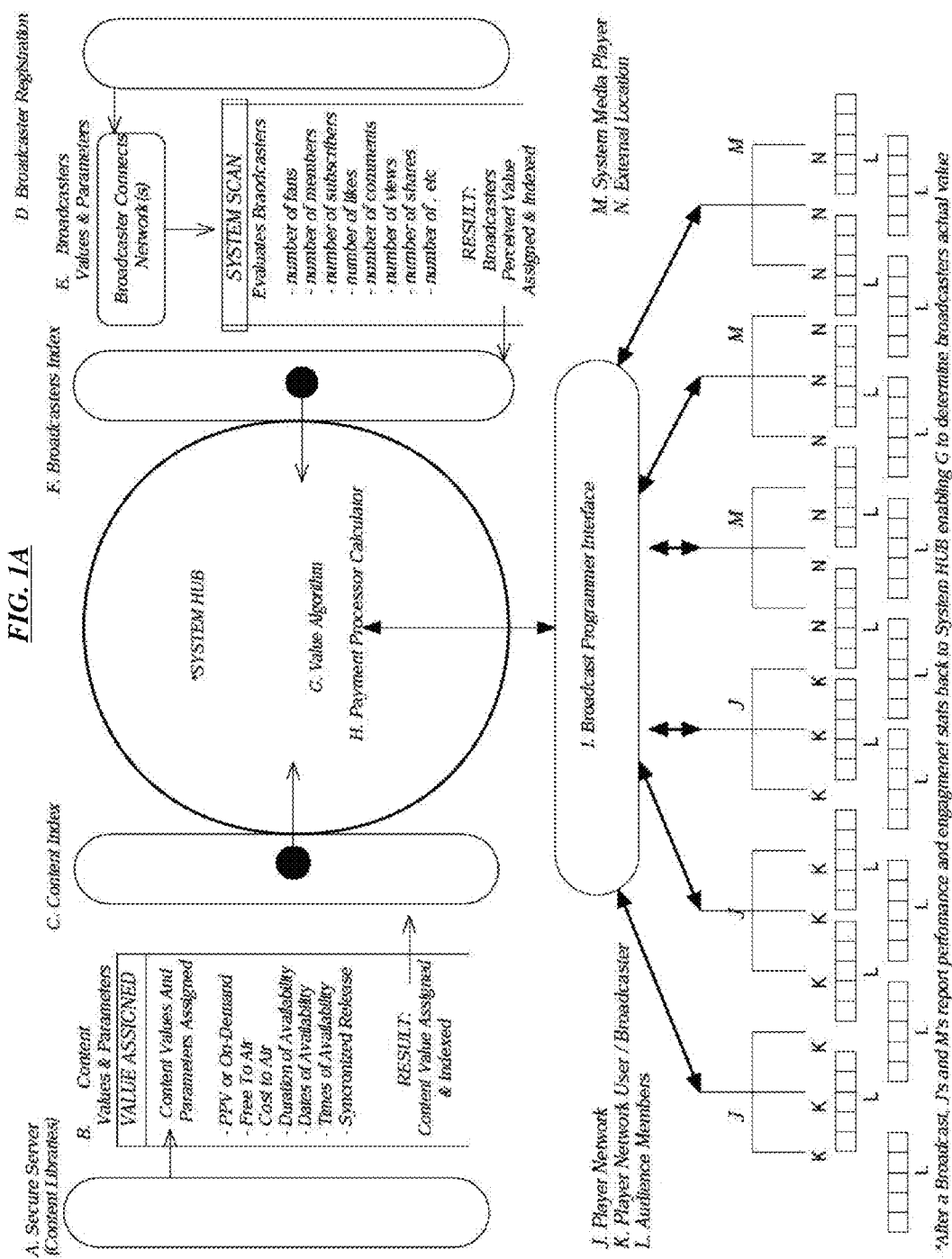

FIG. 1A-B are diagrams illustrating different example content delivery system according to specific embodiments of the present invention. Many novel features can be incorporated into specific embodiments of the invention. The features shown in the figure and discussed below will not be present in all embodiments. The features/functions described below are supported across multiple computing platforms, operating systems, networks, and multimedia input devices, including mobile devices.

In general, FIG. 1 can be understood as illustrating an example system comprising a number of components, some known and some novel, that operate as described herein.

The example system of FIG. 1 is described herein with reference to an example set of operational steps. These steps are provided as one example only, and other methods can be performed within the scope of the invention and using systems of the invention.

According to specific embodiments, content owners or content providers upload files into a secure server A and store it, optionally within one of designated content libraries. According to specific embodiments, the invention assigns content one or more values and parameters B. These values and parameters can be any data that facilitates operation of the system as described herein. A content index C is created or modified to include the content, optionally using one or more of the assigned parameters.

According to specific embodiments, broadcasters who may want to access content for broadcast, register and connect their affiliate network(s) through interface module D. A broadcaster evaluation module E evaluates broadcaster's network based on preset values and parameters. Broadcasters are assigned a perceived value and placed in a data store or index F.

The content is made available to broadcasters through a system hub G, which provides one or more number of interfacing functions as described herein. The value algorithm processes the content parameters from the content index and the perceived value assigned by the broadcaster's index to determine the cost for a broadcaster to air selected content. Additionally, the value algorithm receives information pertaining to engagement level and audience participation concerning the broadcasted content and determines the Broadcaster's Actual Value. The broadcaster's perceived value and actual value determines the Broadcaster's Value and is continually updated based on future broadcast engagement.

A Payment Processor Calculator H recognizes the values assigned e.g., by G and the Value Algorithm for both the content and the Broadcasters, and H generates a cost based on the Broadcaster's value. If the Broadcaster's value is less than the cost of the content the Payment Processor Calculator calculation will increase. If the Broadcaster's value is greater, then the Payment Processor Calculator calculation will decrease.

A Broadcast programmer interface I enables the Broadcasters to program and schedule the content according to their preferences.

Player networks J represent outside participants and partners that the system interacts with in order to engage their network users. Members K affiliated with a player network, are system Broadcasters. Audience members L are viewers, fans or followers of Broadcasters. The system media player M is an independent media player functioning as a broadcaster. External location N represents any location that receives content as an end point.

3. Components, Modules, and Elements

According to various embodiments, the systems and methods as described herein may include a number of novel and known components. Major components of specific embodiments are discussed below.

Content

According to specific embodiments content as used herein includes any digital media file that can be stored or live streamed. A content library is generally any collection of digital files within the secured system or server. The content owner is the person or entity with legal rights to the content. Content for Broadcast use is content accessed for the purpose of disseminating to an audience. Content for Personal use is content accessed for the purpose of personal entertainment or consumption, e.g., simple download of i-Tunes song, simple download of Amazon digital media. Content is sent when it is transmitted to be delivered to media players, media player networks and destination points. Content is fetched when it is made available or retrieved by media players, media player networks and destination points.

Specific Values and Parameters

Specific values and parameters refer to the guidelines in how the content is to be managed or accessed by the secure server.

Timed Releasing

According to specific embodiments, various content may be made available according to a specific schedule. For example, simultaneous and synchronized syndication generally refers to the process of sending content to all connected broadcasters at the same time. Time Released Airing generally refers to making content available at a predetermined time to be fetched and carried by broadcasters Broadcasters In general, according to specific embodiments, a broadcaster can be any user accessing the content library for the purposes of airing content. Affiliated networks generally refer to any player network(s), website(s), blog(s), or media outlet(s) associated with a broadcaster. According to specific embodiments, a broadcast programmer function enables the broadcaster to manipulate and manage content selected for broadcast. Options include, but are not limited to managing the order, adding commentary or overlays to content and tagging or describing content.

Media Players and Destination Points

According to specific embodiments, in general, external media player refers to any embeddable shareable, independent media player. A media player networks is a network or group of media players sharing a name or brand, such as Youtube, Daily Motion, Hulu, etc. A channel or destination point is generally a point displaying content accessed from the secured server Values According to specific embodiments a value algorithm or value module comprises data and logic routines that assesses, quantifies and assigns value to a broadcaster. The algorithm may adjust up or down in relation to the content selected for broadcast. Broadcasters perceived value is generally determined chiefly by the size of broadcasters' audience, fans, subscribers, members etc. Broadcasters Actual value is chiefly evaluated by the level of audience engagement or participation during a broadcast. Broadcasters' value is the result of the quantified and appraised assessment of a Broadcasters' Perceived Value and Broadcasters' Actual Value.

According to further embodiments, content values and parameters may be assigned by content owners, who generally upload their content into systems' content library. The content is made available for broadcast use and is generally assigned a cost to broadcast; e.g., free, on demand, one-time fee, or pay per view by broadcasters' audience base. Content can be assigned a specific length of time it's available; e.g., for one day, one week, one month, or forever.

Advertisers

According to specific embodiments, advertisers or sponsors are entities who have paid or agreed to a revenue share in exchange for displaying their ad in or around content scheduled for broadcast. According to specific embodiments, an ad-loader module or ad manager manages ad campaigns for sponsors and assists with pairing content with ads and broadcasters. According to further specific embodiments, a payment calculator processor: calculates the value assigned by the value algorithm in relation to broadcast engagement; including but not limited to content price, sponsorship/advertising impact and product sales, and distributes revenue share payments to broadcasters, content owners and player network partners.

4. EXAMPLES

Using various methods and technologies described above, the present invention provides a system and/or method and/or business model that facilitates bringing together content owners, broadcasters, and viewers to improve access to content.

According to specific embodiments, one important component is the assignment and determination of a broadcaster's value. This value allows content owners to receive fair revenue from different broadcasters with very different audience sizes. According to specific embodiments, the invention requires that all broadcasters register before accessing any content and verifies broadcaster information. In one example, a broadcaster is assigned a perceived value when the broadcaster connects their channel(s)/destination point(s) to system. The system collects the size of audience, e.g., the number of fans, subscribers, members, either from broadcaster input information or independent verification or both. Multi platform integration and aggregation (the comprehensive, total value including all affiliated networks) is used if more than one channel or destination point is connected, the system gathers the same or comparable information for each channel or destination point broadcaster connects.

Using the data collected, the system assigns Perceived Value of Broadcasters network as discussed herein. According to specific embodiments, a sliding scale based on Perceived Value is applied where the system adjusts the cost the Broadcaster pays for the content.

According to further specific embodiments, a system or method as described herein gathers statistics or information on broadcasters destination point after the broadcast, optionally including, information regarding audience engagement, information regarding viewer participation, information on product purchases of or during the broadcast when applicable. Using the data collected, System assigns Actual Value of Broadcasters Network in relation to a broadcast.

Example 1

Broadcaster connects their YouTube Channel to System
Broadcaster has 1,000,000 subscribers
Broadcasters' perceived value is high
Broadcasters' cost of content goes down
Broadcaster broadcasts said content
Broadcasters' viewer engagement is 100,000 or 10%
Actual Value is 10% of Perceived Value
Broadcasters' Value adjusts accordingly Example 2

Broadcaster connects their YouTube channel, DailyMotion Channel and Blog
Broadcasters' collective audience is 1,000,000
Broadcasters' perceived value is high
Broadcasters' cost of content goes down
Broadcaster broadcasts said content
Broadcasters' viewer engagement is 550,000 or 55%
Actual Value is 55% of Perceived Value
Broadcasters Value is positively impacted and the value of the Broadcaster adjusts accordingly Example 3

"BROADCAST USE" VS. "PERSONAL USE." For understanding this example, consider that currently a network (e.g., ABC, CBS, FOX, etc.) allows you to watch some of their episodes online, which is "personal use" as used herein. The network does this as they don't want to lose control of their content along with their ability to track, monetize, etc.

According to specific embodiments as described herein, the network can upload an episode of a show into the system, apply their specific values and parameters and distribution terms (e.g., cost, length of airing rights, etc) and make the content available for broadcasters to air, which is "broadcast use" as described herein.

Personal Use: Network makes available episode to watch online
    100,000 people log on to watch it at their leisure during the contents availability
    Typically there are 1-2 viewers behind each computer screen during each viewing
    In this scenario, at max, 200,000 people would have seen the episode
    *Estimated Total Reach: 200,000
Broadcast Use: Network uploads same episode and makes it available on Procast™ System:
    10,000 broadcasters pull in the episode or feed to air
    Each broadcaster has an audience of 100,000
    Each broadcaster has a 20% audience engagement
    In this scenario, 200,000,000 people would have seen the episode
    *Estimated Total Reach: 200,000,000

5. Embodiment in A Programmed Information Appliance

Figure 2:
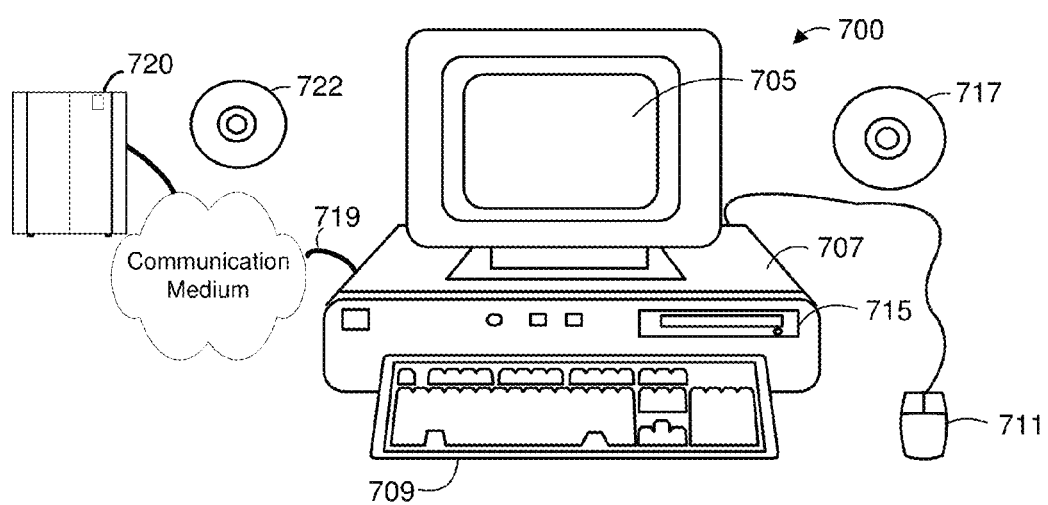
FIG. 2 is a block diagram showing a representative example logic device in which various aspects of the present invention may be embodied.

FIG. 2 is a block diagram showing a representative example logic device in which various aspects of the present invention may be embodied. As will be understood to practitioners in the art from the teachings provided herein, the invention can be implemented in hardware and/or software. In some embodiments of the invention, different aspects of the invention can be implemented in either client-side logic or server-side logic. As will be understood in the art, the invention or components thereof may be embodied in a fixed media program component containing logic instructions and/or data that when loaded into an appropriately configured computing device cause that device to perform according to the invention. As will be understood in the art, a fixed media containing logic instructions may be delivered to a user on a fixed media for physically loading into a user's computer or a fixed media containing logic instructions may reside on a remote server that a user accesses through a communication medium in order to download a program component.

FIG. 2 shows an information appliance (or digital device) 700 that may be understood as a logical apparatus that can read instructions from media 717 and/or network port 719, which can optionally be connected to server 720 having fixed media 722. Apparatus 700 can thereafter use those instructions to direct server or client logic, as understood in the art, to embody aspects of the invention. One type of logical apparatus that may embody the invention is a computer system as illustrated in 700, containing CPU 707, optional input devices 709 and 711, disk drives 715 and optional monitor 705. Fixed media 717, or fixed media 722 over port 719, may be used to program such a system and may represent a disk-type optical or magnetic media, magnetic tape, solid state dynamic or static memory, etc. In specific embodiments, the invention may be embodied in whole or in part as software recorded on this fixed media. Communication port 719 may also be used to initially receive instructions that are used to program such a system and may represent any type of communication connection.

The invention also may be embodied in whole or in part within the circuitry of an application specific integrated circuit (ASIC) or a programmable logic device (PLD). In such a case, the invention may be embodied in a computer understandable descriptor language, which may be used to create an ASIC, or PLD that operates as herein described.

6. Other Embodiments

The invention has now been described with reference to specific embodiments. Other embodiments will be apparent to those of skill in the art. In particular, a user digital information appliance has generally been illustrated as a personal computer. However, the digital computing device is meant to be any information appliance for interacting with a remote data application, and could include such devices as a digitally enabled television, cell phone, personal digital assistant, laboratory or manufacturing equipment, etc. It is understood that the examples and embodiments described herein are for illustrative purposes and that various modifications or changes in light thereof will be suggested by the teachings herein to persons skilled in the art and are to be included within the spirit and purview of this application and scope of the claims.

The invention and various specific aspects and embodiments will be better understood with reference to the following drawings and detailed descriptions. For purposes of clarity, this discussion refers to devices, methods, and concepts in terms of specific examples. However, the invention and aspects thereof may have applications to a variety of types of devices and systems. It is therefore intended that the invention not be limited except as provided in the attached claims and allowable equivalents of those claims. Thus, in addition to descriptions of the present invention in further detail, it is to be understood that the invention is not limited to the particular embodiments described, as such may, of course, vary. It is also to be understood that the terminology used herein is for the purpose of describing particular embodiments only, and is not intended to be limiting.

Furthermore, it is well known in the art that devices, systems and methods such as described herein can include a variety of different components and different functions in a modular fashion. Different embodiments of the invention can include different mixtures of elements and functions and may group various functions as parts of various elements. For purposes of clarity, the invention is described in terms of systems that include many different innovative components and innovative combinations of innovative components and known components. No inference should be taken to limit the invention to combinations containing all of the innovative components listed in any illustrative embodiment in this specification.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention. Where a specific numerical value is mentioned herein, it should be considered that the value may be increased or decreased by up to and including 20%, while still staying within the teachings of the present application, unless some different range is specifically mentioned. Where a specified logical sense is used, the opposite logical sense is also intended to be encompassed.

What is claimed:

1. A method of making available digital content of a content owner to multiple broadcasters wherein broadcasters access content to disseminate to broadcaster audiences, comprising the steps of:
storing the content on a secure content server;
providing an index of the content;
associating one or more specific values and parameters with the content regarding how the content is to be managed or accessed;
providing a broadcast programmer interface that enables a broadcaster to manipulate and manage content selected for broadcast; and
providing a value algorithm that assesses, quantifies and assigns value to a broadcaster.

2. The method of claim 1 further wherein:
the value algorithm adjust up or down in relation to the content selected for broadcast.

3. The method of claim 1 further wherein the broadcast programmer interface enables one or more of:
managing the order;
adding commentary or overlays to content;
tagging or describing content;
other functions related to content broadcast.

4. The method of claim 1 further wherein:
the content is any digital media file that can be stored or live streamed;
the content is stored in one or more content libraries, which are collections of digital files within the secured server.

5. The method of claim 1 further wherein:
the content can be accessed for broadcast use or personal use.

6. The method of claim 1 further comprising:
delivering the content to two or more broadcasters at the same time.

7. The method of claim 1 further comprising:
making the content available at a predetermined time to be fetched and carried by broadcasters.

8. The method of claim 1 further wherein one or more of:
said broadcaster comprises any player network user accessing the content library through a player or player network;
an external media player comprises any embeddable shareable, independent media player;
a media player networks comprise a network or group of media players sharing a name or brand or a group or collection of channels within a digital media receiver or digital media adapter;
a channel or destination point comprises a point displaying content accessed from the secured server;
affiliated networks comprise any player network(s), website(s), blog(s), or media outlet(s) associated with a broadcaster.

9. The method of claim 1 further wherein:
specific values and parameters are determined by one or more of:
cost of the content;
whether it's on-demand or PPV;
duration of availability;
dates and times of availability.

10. The method of claim 1 further wherein:
a broadcasters perceived value is evaluated by one or more of:
number of viewers in the broadcasters' audience;
number of viewers in the broadcasters' fans;
number of viewers in the broadcasters' subscribers;
the number of viewers in the broadcasters' list of members.

11. The method of claim 10 further wherein a broadcasters actual value is evaluated by the level of audience engagement or participation during a broadcast.

12. The method of claim 11 further wherein a broadcasters value is the result of the quantified and appraised assessment of a broadcasters' perceived value and broadcasters' actual value.

13. The method of claim 1 further wherein one or more of:
said media player network comprises at least two different video hosting services, such as YouTube.com; Veoh.com; etc.;
content items can be grouped for broadcast subscription.

14. The method of claim 1 wherein a user can search for content and further wherein one or more of:
said content index allows a user to search for content available to that user and allows a user to filter searches on one or more parameters;
said content search supports different media formats for audio, video, still image and other media;
said content search allows a user to search by media type;
said content search allows a user to search by keyword (tag) description;
said content search allows a user to search by one or more of: popularity; rating; genre;
said content search allows a user to search by personal network to enable collaborative filtering.

15. The method of claim 1 further wherein a content uploader supports multiple media formats, allows a user to indicate media for upload using drag-and-drop and multi-selection of files.

16. The method of claim 1 further wherein a content manager allows a user to perform one or more of: indexing; tagging; sharing.

17. The method of claim 1 further wherein an ad manager provides one or more of:
allowing a user to include advertisements from multiple affiliate networks, such as Commission Junction; Hydra Media, etc.;
allowing a user to select ads to appear in, over, and around their content channel(s);
communication with a server interface to track displayed and/or clicked-through ads and allows said user to participate in any advertising revenue generated;
a process for approval from advertisers and/or networks offer/sponsor library or from supported affiliate networks.

18. A digital content distribution system comprising:
a secure content server;
content comprising individual content items comprising digital content stored on said server;
a content index;
storage for associating one or more specific values and parameters with one or more content items regarding how the content is to be managed or accessed;
a broadcast programmer interface that enables a broadcaster to manipulate and manage and select content items for broadcast; and
a value algorithm that assesses, quantifies and assigns value to a broadcaster.

19. The system of claim 18 further wherein:
the value algorithm adjusts up or down in relation to the content selected for broadcast and the broadcasters' value.

20. The system of claim 18 further wherein the broadcast programmer interface enables one or more of:
managing the order;
adding commentary or overlays to content;
tagging or describing content;
schedule content for future broadcast at a specific time;
delay airing of already scheduled broadcast;
schedule to participation in synchronized airings;
other functions related to content broadcast.

21. The system of claim 18 further wherein:
the content is any digital media file that can be stored or live streamed;
the content is stored in one or more content libraries, which are collections of digital files within the secured server.

22. The system of claim 18 further comprising one or more of:
a synchronize logic module for delivering the content to two or more broadcasters at the same time;
a timed delivery logic module for making the content available at a predetermined time to be fetched and carried by broadcasters.

23. The system of claim 18 further wherein one or more of:
said broadcaster comprises any player network user accessing the content library through a player or player network;
an external media player comprises any embeddable shareable, independent media player;
a media player networks comprise a network or group of media players sharing a name or brand or a group or collection of channels within a digital media receiver or digital media adaptor;
a channel or destination point comprises a point displaying content accessed from the secured server;
affiliated networks comprise any player network(s), website(s), blog(s), or media outlet(s) associated with a broadcaster.

24. The system of claim 18 further wherein:
the value algorithm determines or accesses the content, which is evaluated by the specific values and parameters placed on the content.

25. The system of claim 18 further wherein:
the value algorithm determines or accesses a broadcasters perceived value, which is evaluated by one or more of:
number of viewers in the broadcasters' audience;
number of viewers in the broadcasters' fans;
number of viewers in the broadcasters' subscribers;
the number of viewers in the broadcasters' list of members;
number of comments;
number of click throughs;
degree audience engagement.

26. The system of claim 18 further wherein the value algorithm determines or accesses a broadcasters actual value, which is evaluated by accounting for duplicate fans within broadcasters affiliated networks, the level of audience engagement or participation during a broadcast and specific time or point of engagement.

27. The system of claim 18 further wherein the value algorithm determines or accesses a broadcasters value, which is the result of the quantified and appraised assessment of a broadcasters' perceived value and broadcasters' actual value for each broadcast.

28. A non-transitory computer readable medium containing computer interpretable instructions describing a circuit layout for an integrated circuit that, when constructed according to said descriptions, will configure a circuit to embody the apparatus described in claim 18.

29. A non-transitory computer readable medium containing computer interpretable instructions that when loaded into an appropriately configured information processing device will cause the device to operate in accordance with the method of claim 1.

* * * * *